United States Patent [19]
Fujisaki et al.

[11] Patent Number: 5,899,577
[45] Date of Patent: May 4, 1999

[54] TRANSMISSION DEVICE AND TRANSMISSION METHOD

[75] Inventors: Naoki Fujisaki, Chiba; Nobuyuki Takasu, Tokyo, both of Japan

[73] Assignee: Sony Corporation, Tokyo, Japan

[21] Appl. No.: 08/629,276

[22] Filed: Apr. 8, 1996

[30] Foreign Application Priority Data

Apr. 9, 1995 [JP] Japan .................................. 7-109096

[51] Int. Cl.$^6$ .................................................. H04N 5/783
[52] U.S. Cl. .................................................. 386/68; 386/75
[58] Field of Search ............................... 386/68, 80, 81, 386/75, 52, 96, 105, 106, 111, 112, 125, 126, 104, 46, 124; H04N 5/783

[56] References Cited

U.S. PATENT DOCUMENTS

| | | | |
|---|---|---|---|
| 4,736,260 | 4/1988 | Wilkinson | 386/96 |
| 5,583,652 | 12/1996 | Ware | 386/75 |
| 5,647,047 | 7/1997 | Nagasawa | 386/52 |

FOREIGN PATENT DOCUMENTS 0 605 115  7/1994  European Pat. Off. .

*Primary Examiner*—Huy T Nguyen
*Attorney, Agent, or Firm*—Frommer Lawrence & Haug, LLP.; William S. Frommer

[57] ABSTRACT

In a transmission device, an image signal and an audio signal are played back at a speed n times normal speed from a recording medium and the played back image signal is encoded. The played back audio signal is sampled using a sampling clock signal of a sampling frequency which is proportional to the speed n times normal speed. When n>1, 1/n items of sampling data of the sampling data generated by sampling is encoded. When n<1, all of the sampling data generated by sampling is encoded. The encoded image signal and encoded audio signal are then transmitted to a terminal device.

12 Claims, 6 Drawing Sheets

TRANSMISSION DEVICE AND TRANSMISSION METHOD

BACKGROUND OF THE INVENTION

The present invention relates to a transmission device and transmission method particularly suited for application in, for example, an audio visual server system.

Conventionally, audio signal coding devices where baseband audio signals comprising inputted analog waveforms are sampled at a number of defined sampling frequencies, code processed and then outputted have been widely used.

On the other hand, there are currently various types of coding devices for coding image signals, but recently, image coding devices represented by using the MPEG method have come to be in general use.

One of the characteristics of MPEG-defined image coding is that variable-speed playback of the image at the time of decoding is possible.

However, with usual MPEG method encoding devices, the image signal and accompanying audio signal are independently encoded and the encoding of the image signal takes into consideration the aforementioned variable-speed play-back. However, the encoding of the audio signal does not take into consideration this variable-speed playback and the played-back audio signal is therefore silenced at the time of variable-speed playing-back of the image signal. Generally, encoding taking this kind of variable-speed playback into consideration has been difficult with the existing MPEG method audio encoding devices.

Therefore, with MPEG method encoding devices, with regards to the image signal, if the audio signal that accompanies this image signal can also be encoded so as to be played-back at a variable speed in synchronism with the variable-speed playback of the image signal, then the aforementioned kind of silencing of the audio signal can be avoided even during a specific playing-back and the audio signal can be perceived as being information that is in synchronism with the image signal.

Further, the number of decoding devices produced is definitely greater than that of encoding devices and decoding devices have become particularly superior ones both in economical efficiency and maintainability. Therefore, for example, in a system where a plurality of decoding devices are connected to a single encoding device, it is much disadvantageous for the decoding device to have a special function such as the variable-speed playback of an audio signal in simplifying and downsizing the structure of the decoding device.

It is therefore an object of the present invention to provide a transmission device and transmission method which are flexible and expandable.

SUMMARY OF THE INVENTION

In order to achieve the object of the present invention, a transmission device of the present invention for encoding and transmitting an image signal and an audio signal comprises a playback device for playing back the image signal and the audio signal from a recording medium at a speed n (n>1) times normal speed, a first encoder for encoding the image signal played back by the playback device, a sampler for sampling the audio signal played back by the playback device using a sampling clock of a sampling frequency proportional to the speed n times the normal speed, a second encoder for encoding 1/n items of sampling data of sampling data generated as a result of sampling at the sampler and a transmitter for transmitting signals encoded at the first and second encoders to a terminal device.

Further, in order to achieve the object of the present invention, a transmission device of the present invention for encoding and transmitting an image signal and an audio signal comprises a playback device for playing back the image signal and the audio signal from a recording medium at a speed n (n<1) times normal speed, a first encoder for encoding the image signal played back by the playback device a sampler for sampling the audio signal played back by the playback device using a sampling clock of a sampling frequency proportional to the speed n times the normal speed, a second encoder for encoding sampling data generated as a result of sampling at the sampler and a transmitter for transmitting signals encoded at the first and second encoders to a terminal device.

DETAILED DESCRIPTION OF THE PREFERRED EMBODIMENTS

Figure 1:
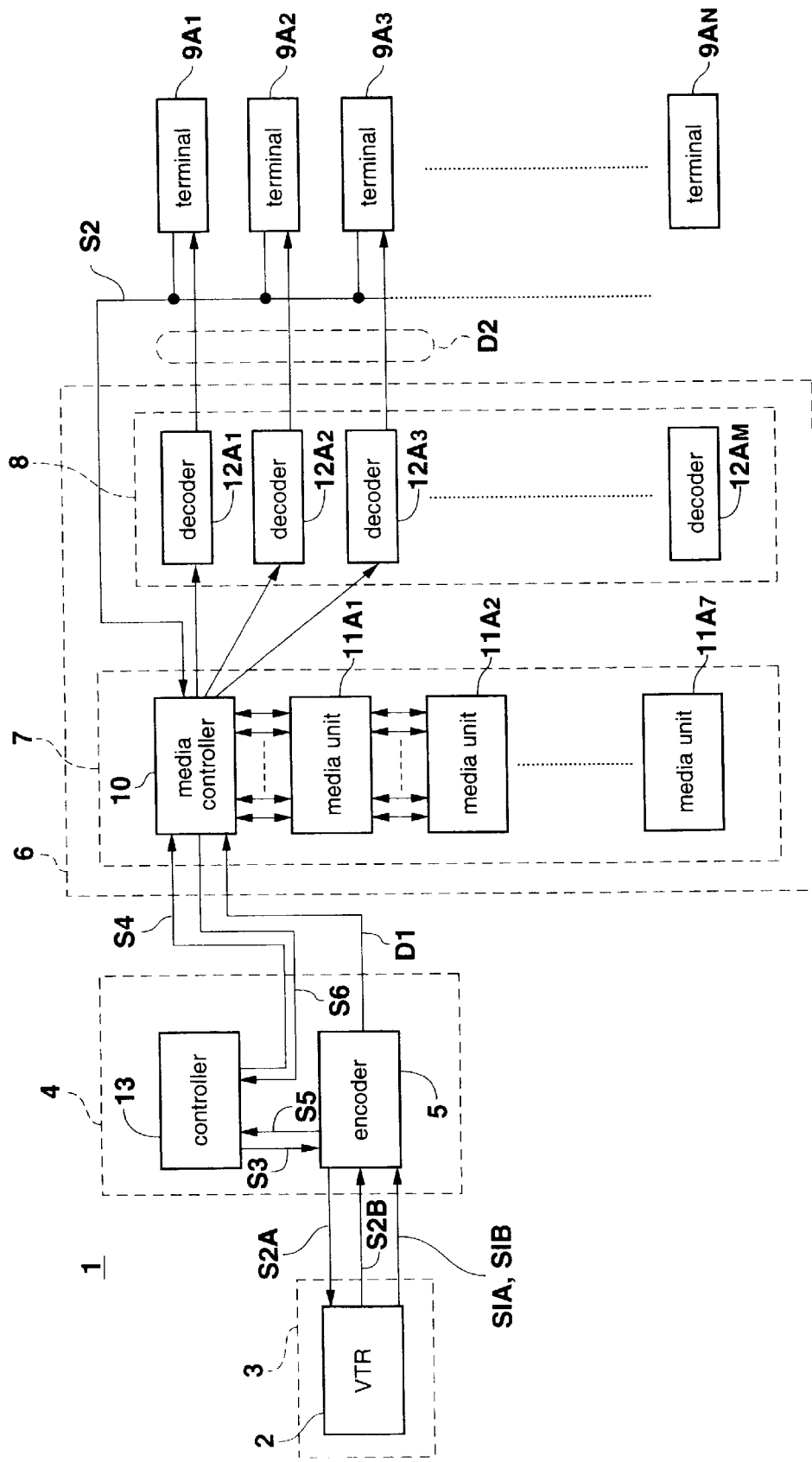
FIG. 1 is a block diagram showing an embodiment of an audio visual server system to which the present invention is applied.

The following is a description with reference to the drawings of one embodiment of the present invention.

An embodiment of an audio visual (hereinafter referred to as "AV") server system to which the present invention is applied, will be described with reference to FIG. 1. An image signal S1A and an audio signal S1B outputted from an information-providing source 3, which comprises a video tape recorder (hereinafter referred to as "VTR") 2 etc. capable of recording and playing back operation, are provided to an encoder 5 of an encoder part 4.

The encoder 5 encodes the image signal S1A and the audio signal S1B using a format that complies with the MPEG2 standard, forms encoded data D1 by multiplexing, and sends this out to the server 6.

The server 6 comprises a recording/playback device 7 and a decoder part 8. The encoded data D1 is temporarily recorded at a prescribed recording medium by the recording/playback device 7 as well as being played back in response to a request signal S2 from the user. Then, the played-back encoded data D1 is, after having been decoded by the decoder 8, sent out to the one of terminals $9A_1$ to $11A_{N-7}$ and $9A_N$ comprising, for example, television receivers, from which there has been a request.

The recording/playback device 7 comprises a media controller 10 and a plurality of media units $11A_1$ to $11A_7$. Encoded data D1 inputted at the media controller 10 is recorded on a hard disc in any one of the media units $11A_1$ to $11A_6$ and $11A_7$. The media units $11A_1$ to $11A_6$ and $11A_7$ are driven in response to request signals S2 from each of the terminals $9A_1$ to $9A_{N-1}$ and $9A_N$ for playing back the requested encoded data D1 recorded on the hard disc.

A plurality of hard disc transmission devices are built into the media units $11A_1$ to $11A_7$. A plurality of items of encoded data D1 can therefore be played back in parallel even when there are a large number of requests from a large number of users (terminal $9A_1$ to $9A_N$) at the same time because the recording/playback device 7 has a plurality of media units $11A_1$ to $11A_7$ with a plurality of hard disc transmission devices being built therein.

The decoder part 8 is constructed from decoders $12A_1$ to $2A_M$, the number of which corresponds to the number of terminals $9A_1$ to $9A_N$ and the number of items of encoded data D1 capable of being played back at the same time by the recording/playback device 7. The encoded data D1 played back by the recording/playback device 7 is decoded and decoded data D2 is sent out to the terminals of $9A_1$ to $9AN_{-1}$ and $9A_N$ for which there has been a request.

At the AV server system 1, the operation of outputting the image audio data S1A and S1B by the information-providing source 3, the encoding operation of the encoder 5 and the operation of recording and playing back the encoded data D1 by the media units $11A_1$ to $11A_7$ under the control of the media controller 10 are controlled by control signals S2A, S3 and S4 outputted from the controller 13 of the encoder 4. Further, the controller 13 monitors the operating conditions of the information-providing source 3 and the encoder 5 on the basis of a status signals S2B and S5 and receives data instructing the operating conditions of the media controller 10 and data instructing the playback speeds requested at each terminal via a control signal S6.

The VTR 2 within the information-providing source 3 plays back the image and audio signals at the specified speed based on data provided from the controller 13 instructing the playback speed and provides the played back image and audio signals to the encoder 5.

Figure 2:
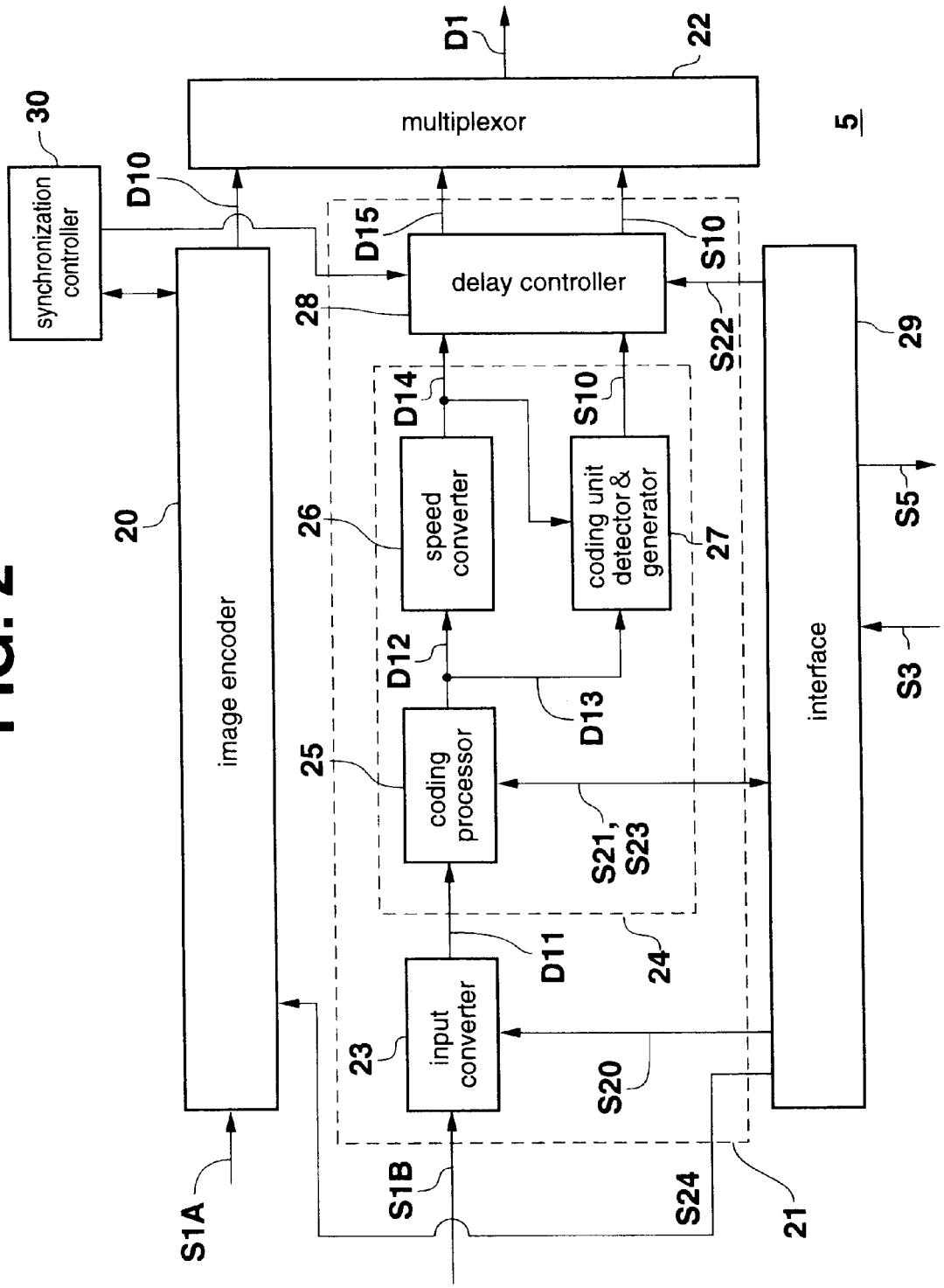
FIG. 2 is a block diagram showing an example of an encoder of the audio visual server system shown in FIG. 1.

Here, in the case of the AV system 1, as shown in FIG. 2, the encoder 5 is constructed from an image encoder 20 for encoding an image signal S1A provided from an information-providing source 3, an audio encoder 21 for encoding an audio signal S1B and an interface 29.

The image encoder 20 encodes the provided image signal S1A using a format conforming to the MPEG2 standard as described above and encoded data obtained in this way is outputted to a multiplexor 22 as image coded data D10.

On the other hand, at the audio encoder 21, an analog audio signal S1B provided from the information-providing source 3 is inputted to an input converter 23 and undergoes analog-to-digital conversion at this input converter 23. Digital audio data D11 obtained in this way is successively provided to a coding processor 25 of a framing signal forming block 24.

The coding processor 25 encodes the digital audio data D11 provided in real-time sequentially in prescribed coding units (corresponding to digital audio data D11 for single frame of the image signal S1A) in conformity with the MPEG2 standard. Coded audio data D12 obtained in this way has header data D13 attached at the leading position of each coded unit and is sequentially sent to the speed converter 26. At this time, the coding processor 25 sends each item of header data D13 attached at the leading position of each coding unit sequentially to a coding unit detector and generator 27.

The speed converter 26 sequentially stores the provided coded audio data D12 and sequentially reads them out at a predetermined rate, i.e. at a rate equal to the rate during normal speed playback of the audio data. The sequentially obtained sequential coded audio data D14 is provided to the coding unit detector and generator 27 and a delay controller 28.

The coding unit detector and generator 27 sequentially detects the positions of each of sequential coded audio data D14 at the head of each coding unit from the sequential coded audio data D14 sequentially outputted from the sequential speed converter 26 on the basis of the provided header data D13. A framing signal S10 indicating the position of this sequential coded audio data D14 is then sent to the delay controller 28.

The delay controller 28, under the control of a synchronization controller 30, adjusts the phases of the sequential coded audio data D14 and the framing signal S10 to be equal to that of the image coded data D10 by providing a prescribed amount of delay corresponding to the relative time difference between corresponding items of the image coded data D10. The phase-adjusted sequential coded audio data D14 and framing signal S10 are then sent to the multiplexor 22 as audio coded data D15 and the framing signal S10. The synchronization controller 30 obtains, from the image encoder 20, data indicating the timing of outputting the image coded data at the head of a unit frame after being coded. The amount of the delay at the delay controller 28 is then controlled on the basis of the data display this timing.

The multiplexor 22 thus sequentially multiplexes one code unit of audio coded data D15 and one frame of image coded data D10 while sequentially identifying the audio coded data D15 at the head of each coding unit on the basis of the framing signal S10. In this way, the multiplexor 22 is operated to form the aforementioned encoded data D1 which is thereafter sent to a media controller 10 (FIG. 1) of the recording/playback device 7 (FIG. 1).

In the case of this embodiment, as is clear from FIG. 2, an interface 29 is provided at the encoder 5.

The interface 29 sends control signals S20, S21, S22 and S24 to the input converter 23, the coding processor 25, the delay controller 28, and the image encoder 20, respectively, on the basis of various parameters in the control signal S3 provided from the controller 13 (FIG. 1). In this way, the operations of the input converter 23, the coding processor 25, the delay controller 28 and the image encoder 20 are controlled.

The interface 29 is supplied from the coding processor 25 with a status output which is further provided to the controller 13 (FIG. 1) as a status signal S5. In this way, the controller 13 (FIG. 1) monitors the encoder 5 on the basis of this status signal S5.

The controller 13 provides data indicating playback with a speed n times normal speed to the VTR 2 and the interface 29 of the encoder 5 on the basis of data indicating the playback speeds requested from each of the terminals. The interface 29 then provides control data for the image encoder 20, input converter 23 and coding processor 25 in such a manner that code processing is carried out in response to n times normal speed.

In the case of this encoder 5, the input converter 23 and the coding processor 25 are capable of coding the audio signal S1B provided at a variable speed (n times speed).

Figure 3:
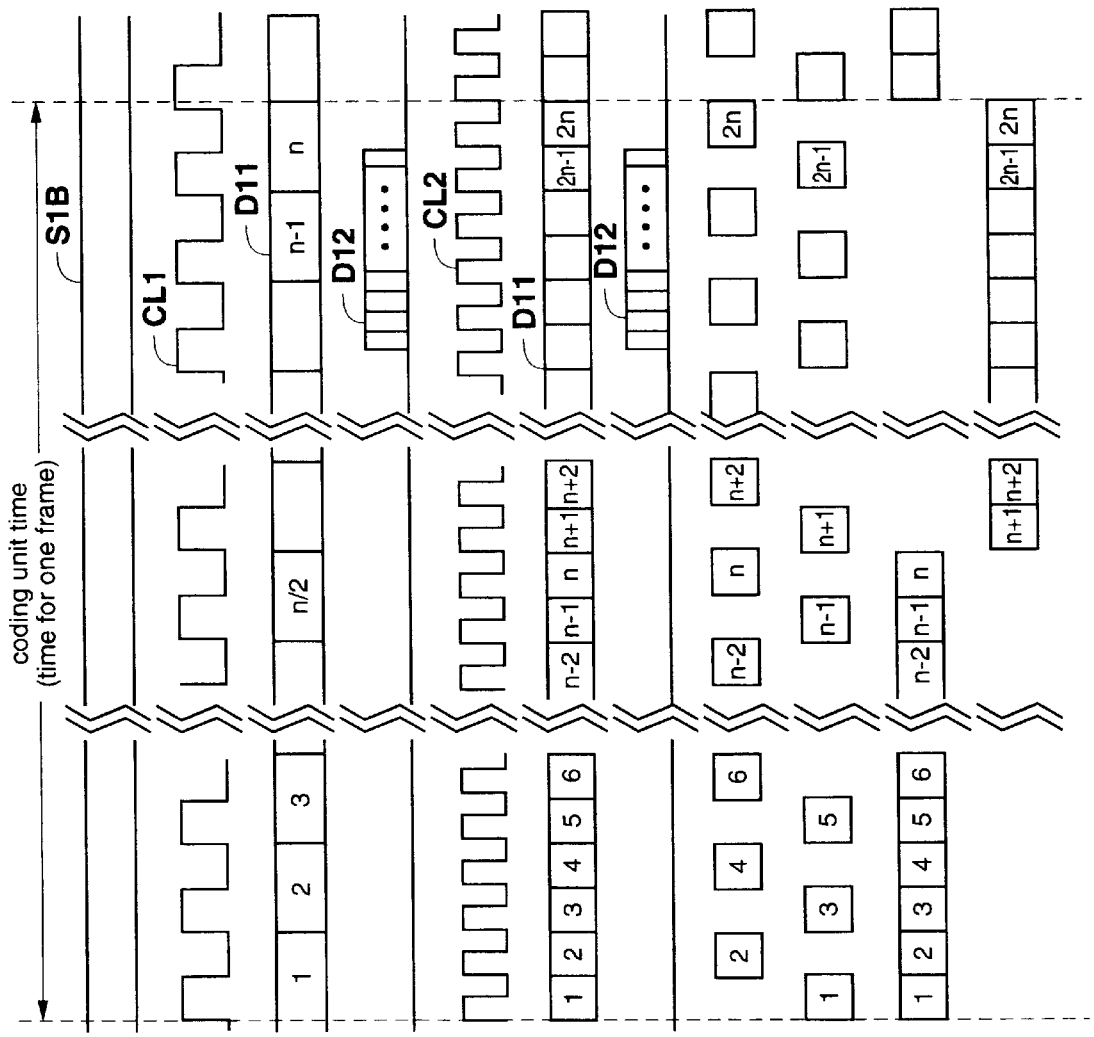
FIG. 3A to FIG. 3K are timing charts illustrating the operation of the encoder shown in FIG. 2.

Namely, during the first coding mode corresponding to high-speed playback (n>1), the input converter 23 samples a provided audio signal S1B as shown in FIG. 3A on the basis of a second clock CL2 (FIG. 3E) of a frequency of n times that of the usual (n=1) first clock CL1 (FIG. 3B).

In this way, the input converter 23 obtains a number of items of audio data D11 (FIG. 3F) that is n times the usual number of digital audio data D11 (FIG. 3C) and that is sequentially provided to the coding processor 25. In addition, FIG. 3E to FIG. 3H show the case where n=2.

The coding processor 25 codes only the 1/n items of digital audio data D11 (FIG. 3J) of the provided digital audio data D11 that are pre-defined in every code unit. In this way, the coding processor 25 can obtain coded audio data D12 (FIG. 3D) compressed along the time axis by 1/n when compared with sampling using the usual clock CL1, as is clear from FIG. 3A to FIG. 3J. In FIG. 3J, there is shown a case where only the n items of digital audio data D11 at the first half of the digital audio data D11 is coded when n=2.

On the other hand, during the second coding mode corresponding to low speed playback (0<n<1), the input converter 23 samples the provided audio signal S1B on the basis of a third clock of a frequency which is n times (0<n<1) the frequency of the first clock CL1. In this way, the input converter 23 obtains items of the digital audio data D11 1/n times less than the usual and sequentially provides them to the coding processor 25.

In this case, the coding processor 25 adds dummy data to the items of digital audio data D11 by an amount corresponding to the number of insufficient items of data before encoding each item of digital audio data D11 and dummy data. In this way, the coding processor 25 is able to obtain coded audio data D12 (FIG. 3G) extended n times along the time axis when compared with sampling using the usual clock CL1.

With the above structure, at the encoder 5, the provided audio signal S1B is sampled at the input converter 23 during the first coding mode corresponding to high-speed playback (n>1) at a first sampling frequency that is n times (n>1) the usual frequency. In this way, 1/n (n>1) items of digital audio data D11 are coded at the coding processor 25 from the obtained digital audio data D11.

On the other hand, during the second coding mode corresponding to low-speed playback (0<n<1), the provided audio signal S1B is sampled at the input converter 23 at a second sampling frequency that is n times (0<n<1) the usual frequency. This is then coded at the coding processor 25 after dummy data has been added to the provided digital audio data D11 by an amount corresponding to the number of insufficient items of data.

In this case, audio coded data D15 formed with the first and second coding modes can be decoded in synchronism with the decoding of the image coded data D10. The silencing of sounds during the specific playing-back can therefore be avoided and the sound can be perceived as information that is synchronized with the image.

According to the above structure, during the first coding mode corresponding to high-speed playback (n>1), the provided audio signal S1B is sampled at the input converter 23 at a first sampling frequency that is n (n>1) times the frequency of the usual frequency. In this way, 1/n (n>1) items of digital audio data D11 are coded at the coding processor 25. Meanwhile, during the second coding mode corresponding to low-speed playback (0<n<1), the provided audio signal S1B is sampled at the input converter 23 at a second sampling frequency that is n times (0<n<1) the usual frequency and is then decoded at the coding processor 25 after dummy data has been added to the obtained digital audio data D11 by an amount corresponding to the number of insufficient items of data. As a result, the audio coded data D15 can be decoded in synchronism with the decoding of the image coded data D10 in a manner that meets variable-speed playback of the image code using the MPEG method. The audio signal can therefore also be played back at a variable speed in synchronism with the variable speed playback of the image signal. Thus, an adaptive and expandable encoder 5 can be achieved.

It is therefore not necessary for the decoders $12A_1$ to $12A_M$ to have any special functions because the coding for the specific playback is carried out on the side of the encoder 5. Specific playback and equivalent variable speed playback is therefore possible with any decoding device.

Further, there are also advantages with regards to various aspects such as expandability, economy, space factor and reliability when compared with the case for achieving the same functions with a conventional coding device.

A further embodiment of the encoder 5 for the AV server system shown in FIG. 1 will now be described with reference to FIG. 4. Portions corresponding to those of FIG. 2 will be given the same reference numerals and their description will be omitted.

Figure 4:
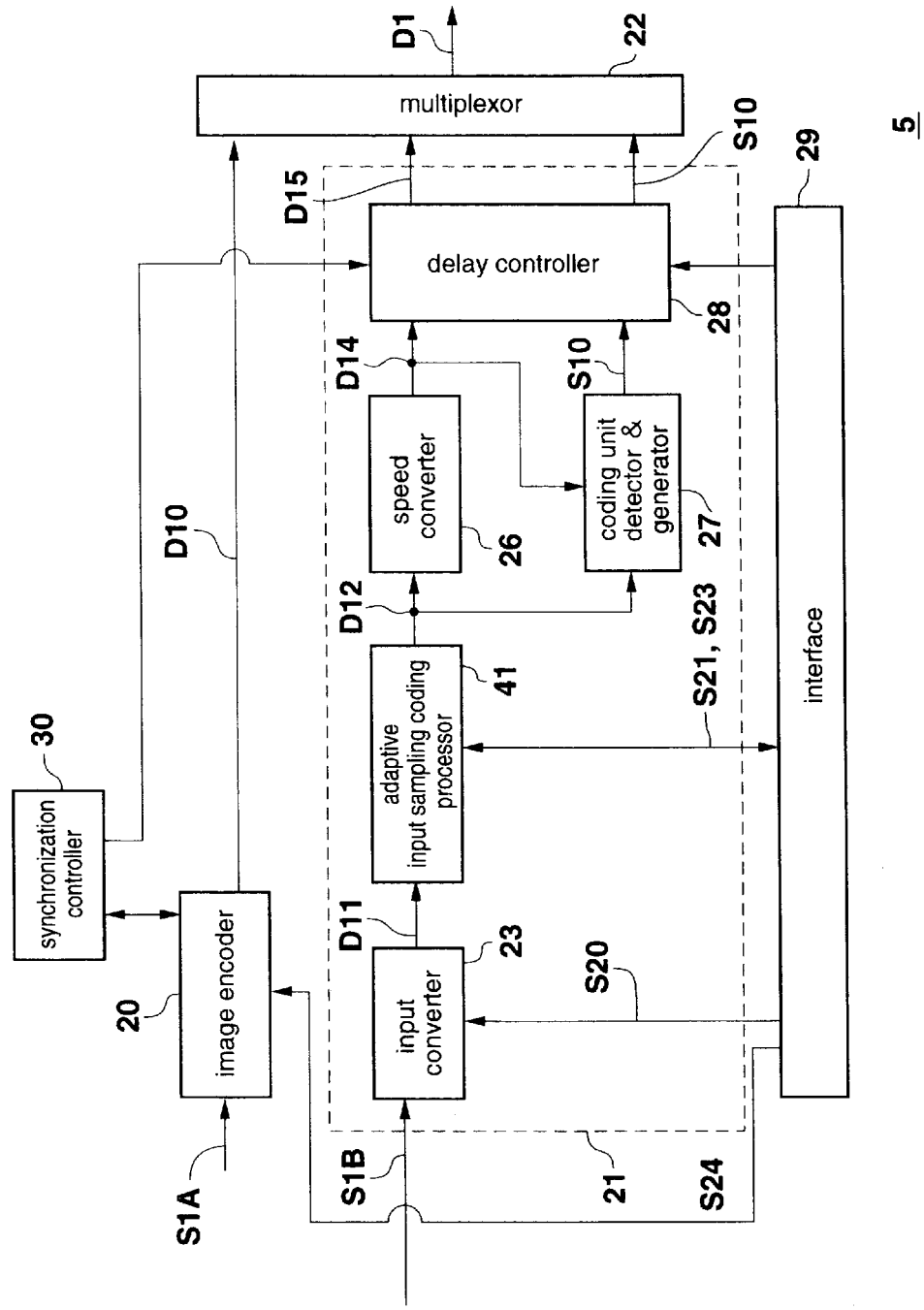
FIG. 4 is a block diagram showing another embodiment of an encoder of the audio visual server system shown in FIG. 1.
Figure 5:
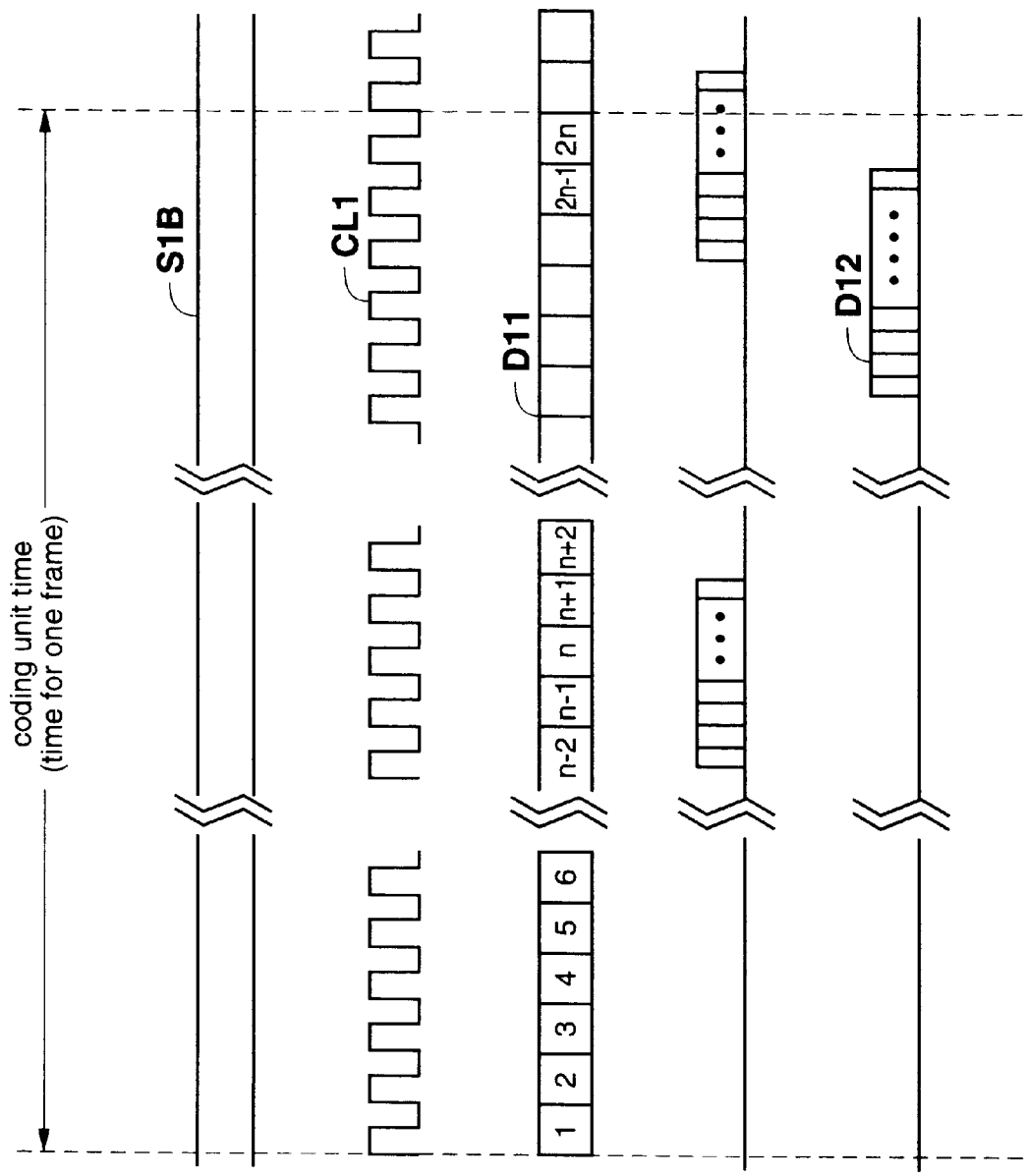
FIG. 5A to FIG. 5E are timing charts illustrating the operation of the encoder shown in FIG. 4.

At the encoder 5 shown in FIG. 4, during the first coding mode corresponding to the high-speed playback (n>1), the provided audio signal S1B of FIG. 5A is sampled at the input converter 23 at a clock signal CL1 having a frequency n times (n>1) the usual one as shown in FIG. 5B and the digital audio data D11 of sample number n as shown in FIG. 5C are obtained which are provided to the input sampling adaptive coding processor 41.

Figure 6:
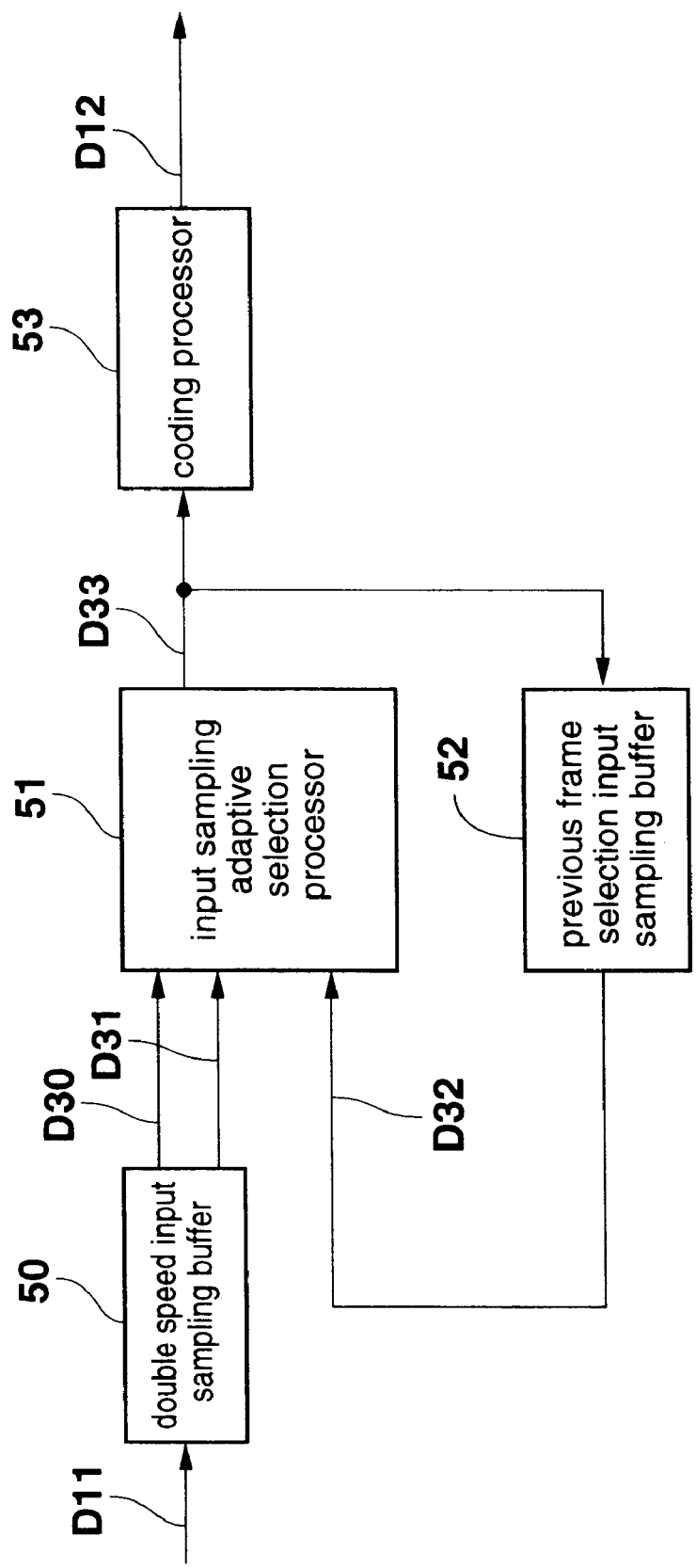
FIG. 6 is a block diagram showing an example of an adaptive coding processor for the encoder shown in FIG. 4.

The adaptive coding processor 41 has the structure as shown in FIG. 6. The digital audio data D11 provided from the input converter 23 is divided into a front-half n-items and a back half n-items via a double speed input sampling buffer 50 and then inputted to an input sampling adaptive selection processor 51 as two systems of first and second digital audio data D30 and D31 (FIG. 5D).

The input sampling adaptive selection processor 51 selects, on the basis of the first or second digital audio data D32 which is for the precedently selected previous frame and is supplied at this time from a previous frame selection input sampling buffer 52, one of either first or second sampling data of the present frame D30 or D31 which has a stronger correlation to the digital audio data D32. The selected first or second sampling data D30 or D31 is then sent to the previous frame selection input sampling buffer 52 and a coding processor 53 as adaptive digital audio data D33.

The coding processor 53 forms the coded audio data D12 as shown in FIG. 5E by coding the provided adaptive digital audio data D33 and sends the coded audio data D12 to the sequential speed converter 26 (FIG. 2).

In this way, the input sampling adaptive coding processor 41 selects and encodes the appropriate one of the front half or the back half of the n items of the digital audio data D11 provided with the number of n (n>1) times the usual.

According to the above structure, by dividing sampling data S12 outputted from the input converter 23 into a front-half n-items and a back-half n-items and selectively coding the one thereof having higher correlation with the previous frame, in the same way as for the first embodiment, the audio coded data D15 can be decoded in synchronism with the image coded data D10 in such a manner as to meet the variable speed displaying of the image code using the MPEG method, and thus an adaptive and extendible encoder 5 can be achieved.

In the aforementioned embodiment and further embodiment, the case was described where the encoder 5 according to the present invention is applied to the AV system 1 shown in FIG. 1. However, the present invention is by no means limited thereto and may be well applied to coding devices that can be used in various other technological fields of digital data communications.

In the aforementioned embodiment and further embodiment, the number of items of digital audio data D11 corresponding to one frame of an image are taken as a coding unit at the encoder 5. However, the present invention is by no means limited thereto, and other coding units are also possible.

Moreover, in the aforementioned further embodiment, the case is described where the coded audio data D12 outputted from the input converter 23 is divided into a front-half n-items and a back half n-items. However, the present invention is by no means limited thereto and the digital audio data D11 outputted from the input converter 23 is not just limited to be divided into a front half and a back half but may be divided into n series, with each series being provided to the input sampling adaptive selection processor 51, provided that the data is made to be compatible with high-speed playback of n-times.

Moreover, in the aforementioned embodiment, the case is described where just the front n-items of the digital audio data D11 are coded for the case for n=2, as shown in FIG. 3J. However, the present invention is by no means limited thereto, and it is also possible to code just n items of digital audio data D11 every other one as shown in, for example, FIG. 3H and FIG. 3I, or just code the back half n-items of digital audio data D11 as shown in FIG. 3K.

As described above, during a first coding mode corresponding to high-speed playback, the audio signal is sampled at a second sampling frequency which is higher than a standard first sampling frequency and the obtained sampling data is selectively coded in real-time with a number of items corresponding to the ratio of the first sampling frequency to the second sampling frequency every prescribed coding unit, and, during a second coding mode corresponding to the low-speed playback, the audio data is sampled at a third sampling frequency lower than the first sampling frequency and, after dummy data has been added every coding unit to the obtained sampling data by an amount corresponding to the ratio of the first sampling frequency to the third sampling frequency, the sampling data and dummy data are coded in real-time. The audio signal can therefore be played-back at a variable speed in synchronism with the variable-speed playing-back of the image signal and a flexible and expandable coding device and coding method can be provided. Further, by using this coding device, a transmission device can be obtained which is compatible with variable-speed playing back of the image signal.

What is claimed is:

1. A transmission device for encoding and transmitting an image signal and an audio signal comprising:

playback means for playing back said image signal and said audio signal from a recording medium at a speed n (n>1) times normal speed;

first encoding means for encoding said image signal played back by said playback means, said first encoding means producing an encoded image signal which is delineated in frames;

sampling means for sampling said audio signal played back by said playback means using a sampling clock of a sampling frequency propotional to said speed n times said normal speed, whereby a total number of audio samples are generated by said sampling means for each frame of said encoded image signal;

second encoding means for encoding, for each frame of said encoded image signal, 1/n of said total number of audio samples to produce an encoded audio signal; and transmission means for transmitting the encoded image signal and the encoded audio signal at said first and second encoding means to a terminal device.

2. A transmission device according to claim 1, wherein said transmission means further comprises means for transmitting said encoded image and audio signals to the terminal device of a plurality of terminal devices upon a request from said terminal device of said plurality of said terminal devices.

3. A transmission device according to claim 1, wherein said terminal device provides data expressing said n-times-normal speed to said playback means.

4. A transmission device according to claim 1, further comprising synchronizing means for synchronizing the encoded image signal at said first encoding means with the encoded audio signal at said second encoding means.

5. A transmission device according to claim 1, wherein said second encoding means further comprises conversion means for converting a data rate for the encoded audio samples to a rate equal to a data rate at a normal playback speed.

6. A transmission device for encoding and transmitting an image signal and an audio signal comprising, playback means for playing back said image signal and said audio signal from a recording medium at a speed n(n<1) times normal speed;

first encoding means for encoding said image signal played back by said playback means, said first encoding means producing an encoded image signal which is delineated in frames;

sampling means for sampling said audio signal played back by said playback means using a sampling clock of a sampling frequency proportional to said speed n times said normal speed, whereby a total number of audio samples are generated by said sampling means for each frame of said encoded image signal;

second encoding means for encoding for each frame of said encoded image signal said total number of audio samples generated by said sampling means, said second encoding means adding a number of dummy data samples to said total number of audio samples such that the resulting number of audio samples per frame is equal to the number of audio samples per frame that would result when n=1 to produce an encoded audio signal; and transmission means for transmitting the encoded image signal and the encoded audio signal at said first and second encoding means to a terminal device.

7. A transmission device according to claim 6, wherein said transmission means further comprises means for transmitting said encoded image and audio signals to the terminal device of a plurality of terminal devices upon a request from said terminal device of said plurality of said terminal devices.

8. A transmission device according to claim 6, wherein said terminal device provides data expressing said n-times-normal speed to said playback means.

9. A transmission device according to claim 6, further comprising synchronizing means for synchronizing the encoded image signal at said first encoding means with the encoded audio signal at said second encoding means.

10. A transmission device according to claim 6, wherein said second encoding means further comprises conversion means for converting a data rate for the encode audio samples to a rate equal to a data rate at a normal playback speed.

11. A method of encoding and transmitting an image signal and an audio signal comprising the steps of:

playing back said image signal and said audio signal from a recording medium at speed n(n>1) times normal speed by playback means;

encoding said image signal played back by said playback means, said encoding producing an encoded image signal which is delineated in frames;

sampling said audio signal played back by said playback means using a sampling clock of a sampling frequency proportional to said speed n times said normal speed, whereby a total number of audio samples are generated by said sampling for each frame of said encoded image signal;

encoding 1/n of said total number of audio samples for each flame of said encoded image signal to produce an encoded audio signal; and transmitting said encoded image signal and said encoded audio signal to a terminal device.

12. A method of encoding and transmitting an image signal and an audio signal comprising the steps of:

playing back said image signal and said audio signal from a recording medium a speed n(n<1) times normal speed by playback means;

encoding said image signal played back by said playback means, said encoding producing an encoded image signal which is delineated in frames;

sampling said audio signal played back by said playback means using a sampling clock of a sampling frequency proportional to said speed n times said normal speed, whereby a total number of audio samples are generated by said sampling for each frame of said encoded image signal;

encoding, for each frame of said encoded image signal, said total number of audio samples generated by said sampling step, said encoding including adding a number of dummy data samples to said total number of audio samples such that the resulting number of audio samples per frame is equal to the number of audio samples per frame that would result when n=1 to produce an encoded audio signal; and transmitting said encoded image signal and said encoded audio signal to a terminal device.

* * * * *